United States Patent Office

2,871,265
Patented Jan. 27, 1959

2,871,265

PROCESS FOR PREPARING CHLORTETRA-CYCLINE SULFATE

Charles Claude Reed and Robert Winterbottom, Pearl River, N. Y., assignors to American Cyanamid Company, New York, N. Y., a corporation of Maine No Drawing. Application September 27, 1956
Serial No. 612,349

7 Claims. (Cl. 260—559)

This invention relates to an improved process for preparing in high yield crystalline chlortetracycline sulfate of a quality suitable for parenteral use.

Various procedures are known for preparing salts of chlortetracycline such as hydrochloride and sulfate salts. In general, such processes usually involve a simple acidification of an alcoholic solution of chlortetracycline at a low pH with either hydrochloric or sulfuric acid whereby the hydrochloride or sulfate salt of chlortetracycline is precipitated. Another procedure for preparing these salts involves dissolving crude chlortetracycline in an alcoholic solvent by the addition of base, filtering off the insoluble impurities and recovering the chlortetracycline as a mineral acid salt by the addition of a mineral acid to the solvent solution.

While these procedures result in the production of chlortetracycline sulfate of a form that is satisfactory for many purposes, these processes leave much to be desired from the standpoint of quality of the final product and from the standpoint of yield, the yield usually averaging around 50%. Consequently, efforts have been directed toward the development of a manufacturing process that would increase yield and improve the quality of the final product.

In accordance with the present invention, it has been discovered that it is possible to prepare crystalline chlortetracycline sulfate under such conditions that high yields, of the order of 90–95%, are attainable of a high quality chlortetracycline sulfate that is suitable for parenteral use. Essentially, the present invention involves two steps. The first step involves the preparation of a slurry of neutral chlortetracycline in a solvent such as a lower alkoxy lower alkanol, i. e. 2-ethoxyethanol, and treatment with sulfuric acid to effect solution of the chlortetracycline as the sulfate. The second step involves the addition of a lower alcohol, i. e. n-butanol, which enhances crystallization of the sulfate by virtue of its low solvent power therefor.

As stated hereinabove, yields of 90–95% are attainable by this improved process. The product obtained by this method has an attractive light yellow color and crystallizes in the form of needles. The products obtained by our improved process usually assay between 800 and 900 grammas per milligram depending upon the moisture and solvent content, and hence upon the thoroughness with which the product is dried. It should be noted that the theoretical assay of the sulfate as the hydrochloride is about 892 grammas per milligram.

In carrying out the present invention, neutral chlortetracycline is slurried in about 1.5 volumes of a lower alkoxy lower alkanol such as 2-methoxyethanol or 2-ethoxyethanol. To this slurry is added slightly less than one mole of sulfuric acid, i. e. 0.92–0.95 mole of sulfuric acid based upon the amount of chlortetracycline. The acid is preferably added as a solution in a volume of 2-methoxyethanol or 2-ethoxyethanol equal to that used to slurry the neutral chlortetracycline. In other words, a total of about 3 volumes of alkoxy alkanol is used in a preferred embodiment, half of which is used to slurry the neutral chlortetracycline and the other half is used for dilution of the acid, although this precise apportionment is not critical. In general, about 3 volumes of alkoxy alkanol constitutes a practical minimum since complete solution will not result if much less than this quantity is used. The yield of chlortetracycline sulfate decreases with increasing amounts of alkoxy alkanol and about 20 volumes constitutes an extreme upper limit.

The dilution of the acid prior to its addition to the slurry of neutral chlortetracycline accomplishes a twofold purpose, avoiding local excess concentrations of sulfuric acid which would destroy some of the chlortetracycline, and also avoiding heat formation which is conducive to esterification of the 2-ethoxyethanol to form the sulfate and consequent loss of the acid. To minimize the latter condition, it is desirable to use 50% sulfuric acid rather than concentrated sulfuric acid, and secondly, it is desirable to chill the 2-ethoxyethanol prior to adding the acid. It may also be desirable to chill the neutral chlortetracycline slurry prior to acidification. If chilling is to be carried out, temperatures of from −5° C. to +25° C. may be used satisfactorily.

The amount of acid is preferably slightly less than one mole based upon the amount of chlortetracycline. More than one mole is likely to yield a product of inferior quality.

On addition of the acid to the slurry of neutral chlortetracycline, a solution forms gradually. Agitation for thirty minutes generally suffices to form a substantially complete solution. Insoluble matter, which may include a small amount of residual neutral chlortetracycline, is conveniently removed by filtration with or without a filter aid.

To the clarified solution, a suitable quantity, for example, about 8 volumes of a lower alcohol such as n-butanol is added, based on the amount of starting material, and the mixture is allowed to crystallize. Crystallization occurs quite rapidly, particularly if the mixture is seeded and stirred. Crystallization at low temperature without agitation may favor the formation of large crystals. The amount of n-butanol may be varied considerably, and will depend partly upon the amount of 2-ethoxyethanol used. It is preferred that at least twice the volume of 2-ethoxyethanol be used, and six times the volume of 2-ethoxyethanol would not be unduly detrimental.

The crystalline product which forms is removed by filtration, washed and dried. Isopropanol is particularly suitable as a wash solvent, having a low solubility capacity but effectively removing colored impurities. It has the further advantage of being easily removed in the drying cycle.

While the 2-ethoxyethanol-n-butanol combination of solvents has been found to be very satisfactory in producing high yields of high quality chlortetracycline sulfate, other combinations of lower alkoxy lower alkanols and other lower alcohols may be used. For example, 2-methoxyethanol is another suitable lower alkoxy lower alkanol, and methanol, ethanol, propanol, isopropanol, etc., are other suitable lower alcohols which may conveniently be used in place of butanol.

The invention will be described in greater detail in conjunction with the following specific examples.

*Example 1*

To 1500 milliliters of 2-ethoxyethanol chilled to 10–15° C., 110 milliliters of concentrated sulfuric acid is added slowly. This solution is then added to a slurry of 1000 grams of chlortetracycline neutral in 1500 milliliters of 2-ethoxyethanol. On stirring for about 30 minutes, a substantially complete solution is obtained, which is filtered to remove any insoluble matter. To the clear filtrate is added 8 liters of n-butanol, and the mixture is stirred for 15 minutes, at which time crystallization begins. After standing at 4° C. for 2 hours, the product is filtered, washed twice with 500 milliliters of n-butanol and once with 7 liters of isopropanol, and dried in vacuo at 40°–50° C. for 24 hours. A yield of 10.15 grams of chlortetracycline sulfate assaying 840 γ/mg. is obtained.

*Example 2*

To a slurry of 15 grams of neutral chlortetracycline in 60 milliliters of 2-ethoxyethanol is added 1.5 milliliters of concentrated sulfuric acid, and the mixture is stirred to obtain a substantially clear solution. The small amount of remaining insolubles is removed by filtration. To a 20 milliliter aliquot of the filtrate, 40 milliliters of n-butanol is added. The mixture is seeded and permitted to stand for 17 hours at 4° C. while crystallization occurs. The product is filtered, washed with n-butanol and petroleum ether, and vacuum dried to yield 4.3 grams of chlortetracycline sulfate assaying 822 γ/mg.

*Example 3*

Another 20 milliliter aliquot of the filtrate from Example 2 is mixed with 40 milliliters of isopropanol. An amorphous precipitate forms rapidly, but crystallizes on standing for 17 hours at 4° C. After filtering, the product is washed with isopropanol and petroleum ether, and vacuum dried to yield 4.7 grams of chlortetracycline sulsulfate assaying 797 γ/mg.

*Example 4*

To another 20 milliliter aliquot of the filtrate from Example 2, 40 milliliters of methanol is added. On standing at 4° C. for 17 hours, a crystalline product forms which is filtered, washed with isopropanol and petroleum ether, and dried in vacuo to yield 3.5 grams of chlortetracycline sulfate assaying 746 γ/mg.

*Example 5*

A mixture of 5.5 milliliters of concentrated sulfuric acid and 4.5 milliliters of water is chilled to 10° C. and added to 75 milliliters of 2-ethoxyethanol which is previously chilled to 20° C. The dilute acid is then slowly added to a slurry of 50 grams of neutral chlortetracycline in 75 milliliters of 2-ethoxyethanol, keeping the temperature below about 30° C. The solution which forms on stirring is filtered to remove any insolubles and mixed with 250 milliliters of isopropanol. After seeding, the mixture is stirred for 1½ hours and filtered to remove the crystalline product, which is washed with isopropanol and vacuum dried. A yield of 53.5 grams of chlortetracycline sulfate assaying 882 γ/mg. is obtained.

We claim:

1. The process of preparing crystalline chlortetracycline sulfate which comprises slurrying neutral chlortetracycline in a lower alkoxy lower alkanol solvent, adding slightly less than a stoichiometric amount of sulfuric acid to the slurry so as to effect solution of the chlortetracycline as the sulfate, filtering to remove any insoluble impurities adding a lower alkanol to the solvent solution so as to form crystals of chlortetracycline sulfate and thereafter recovering the crystalline chlortetracycline sulfate.

2. The process according to claim 1 in which the lower alkoxy lower alkanol is 2-ethoxyethanol.

3. The process according to claim 1 in which the lower alkanol is n-butanol.

4. The process according to claim 1 in which the lower alkanol is isopropanol.

5. The process according to claim 1 in which the lower alkanol is methanol.

6. The process according to claim 1 in which the amount of lower alkoxy lower alkanol is present to the extent of between about 3 and 20 volumes per unit weight of neutral chlortetracycline.

7. The process according to claim 1 in which the lower alkanol is used in an amount ranging from about twice to about six times the volume of lower alkoxy lower alkanol.

References Cited in the file of this patent

UNITED STATES PATENTS

| 2,671,806 | Winterbottom et al. | Mar. 9, 1954 |

FOREIGN PATENTS

| 692,131 | Great Britain | May 27, 1953 |
| 713,411 | Great Britain | Aug. 11, 1954 |
| 303,460 | Switzerland | Feb. 1, 1955 |